United States Patent [19]
Hirabayashi et al.

[11] Patent Number: 5,309,524
[45] Date of Patent: May 3, 1994

[54] IMAGE REDUCING APPARATUS

[75] Inventors: Yasuji Hirabayashi, Tokyo; Mitsuru Maeda, Yokohama; Tadashi Yoshida, Ichikawa; Akihiro Katayama, Kawasaki, all of Japan

[73] Assignee: Canon Kabushiki Kaisha, Tokyo, Japan

[21] Appl. No.: 886,945

[22] Filed: May 22, 1992

Related U.S. Application Data

[60] Division of Ser. No. 670,528, Mar. 18, 1991, Pat. No. 5,138,672, which is a continuation of Ser. No. 446,791, Dec. 6, 1989, abandoned.

[30] Foreign Application Priority Data

Dec. 8, 1988 [JP] Japan .................. 63-311692
Dec. 8, 1988 [JP] Japan .................. 63-311693

[51] Int. Cl.$^5$ .............................................. G06K 9/42
[52] U.S. Cl. ................................... 382/47; 358/451
[58] Field of Search ............. 382/47, 54; 340/731; 358/138, 140, 451

[56] References Cited

U.S. PATENT DOCUMENTS

| | | | |
|---|---|---|---|
| 3,289,164 | 11/1966 | Rabinow | 382/47 |
| 4,153,896 | 5/1979 | White | 382/47 |
| 4,656,664 | 4/1987 | Anderson et al. | 382/47 |
| 5,138,672 | 8/1992 | Hirabayashi et al. | 382/54 |

Primary Examiner—Leo H. Boudreau
Attorney, Agent, or Firm—Fitzpatrick, Cella, Harper & Scinto

[57] ABSTRACT

An image reducing apparatus for obtaining a reduced image from an image of an original size has: a filter to execute a filtering process to the image of the original size every image block of a predetermined size; a discriminating circuit to discriminate a structure of the image block filter processed by the filter; a correcting circuit to correct an output of the filter in accordance with the discriminated structure; and a binarization unit to binarize the output of the filter. By executing the reduction suitable for the image content in consideration of the peripheral images of the object pixel to be reduced and the peripheral reduced images, a reduced image can be obtained without extinguishing the content of the image of the original size, and especially, without fading or losing the thin lines in the reduced image.

11 Claims, 11 Drawing Sheets

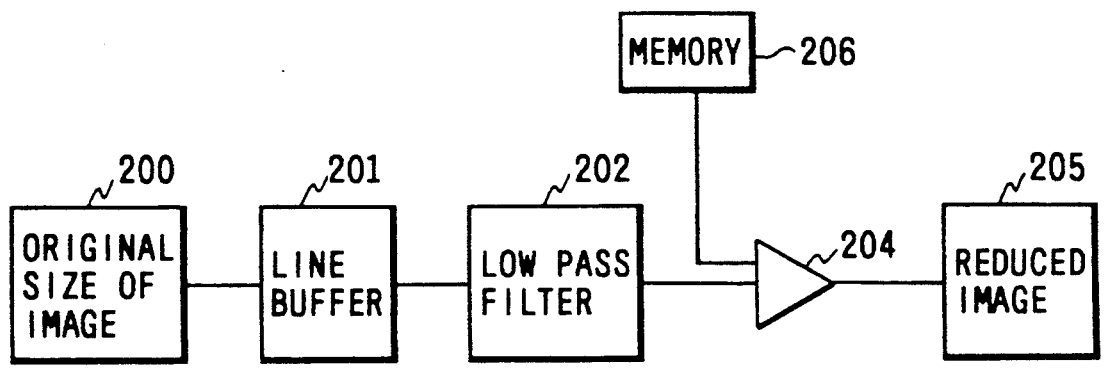
FIG. 1
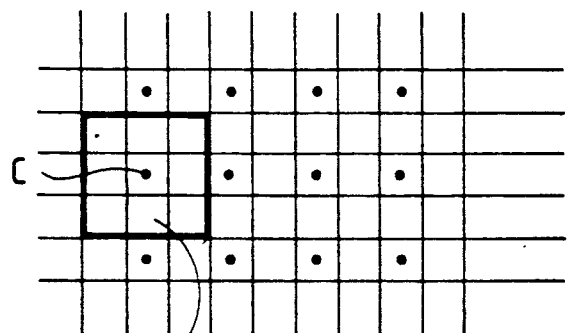
FIG. 2A
FIG. 2B
FIG. 2C

IMAGE REDUCING APPARATUS

This application is a division of application Ser. No. 07/670,528, filed Mar. 18, 1991, now U.S. Pat. No. 5,138,672, which was a continuation of application Ser. No. 07/446,791, filed Dec. 6, 1989, now abandoned.

BACKGROUND OF THE INVENTION

1. Field of the Invention

The present invention relates to an image reducing apparatus for obtaining a reduced image from an image of an original size.

2. Related Background Art

Hitherto, a sub-sampling method, a projecting method, a decision-of-majority method, an error diffusion method, or the like has been used as means for obtaining a reduced image from an image of the original size. The projecting method is constructed as shown in FIG. 1.

Reference numeral 200 denotes an image of an original size such as a binary image; 201 indicates a line buffer which stores pixels (reference pixels) to be filtered and constructs a pixel block; and 202 a low pass filter for determining an objective pixel in accordance with the sampling period corresponding to a reduction ratio and for executing a smoothing process by using the objective pixel as a center. A projection value calculator to output a projection value is constructed by the line buffer 201 and low pass filter (LPF) 202. Reference numeral 204 indicates a comparator for comparing the projection value with a threshold value T and binarizing. The threshold value T is stored in a threshold value memory 206. Reference numeral 205 indicates a reduced image obtained.

The operation in the case of reducing the image size to ½ in each of the vertical and lateral directions will now be described as an example. In FIG. 2A, reference pixels which are used in the projecting method are shown by being surrounded by a bold frame line, in which a pixel C is set to a center pixel. Each reference center pixel is shown by a black dot. Assuming that the pixel values (0 or 1) of the reference pixels are set to $D_{1.1}$ to $D_{3.3}$ as shown in FIG. 2B, a projection value sum by the LPF 202 is obtained as follows:

$$\text{sum} = D_{1.1} + D_{1.3} + D_{3.1} + D_{3.3} + \quad (1)$$
$$2 \times (D_{1.2} + D_{2.1} + D_{2.3} + D_{3.2}) +$$
$$4 \times D_{2.2}$$

When sum $\geq T$, the comparator 204 generally outputs "1" as a binary threshold value by using T=8. When sum $<T$, "0" is output.

The reduced image of ½ is obtained by the above operations.

On the other hand, there has been also known an image reducing method whereby a smoothed image is obtained from an image of an original size and, by sampling the pixels of the smoothed image, a reduced image is obtained. The projecting method is constructed as shown in FIG. 3.

Reference numeral 301 denotes an image of an original size and is a multivalue image; 302 indicates a low pass filter (LPF); 303 a sub-sampling unit; and 304 a reduced image derived by the device. The input image of the original size is subjected to a low pass filtering process which differs depending on the reduction size by the LPF 302, thereby obtaining the smoothed pixels. The number of pixels necessary to construct the reduced image 304 among the smoothed pixels is obtained by the sub-sampling unit 303. On the other hand, in the case where the pixels of the input image have binary values, as shown in FIG. 4, a binarization unit 305 is added after the sub-sampling unit 303 in FIG. 3 and the multivalue data which was processed by the LPF is again binarized, thereby obtaining the reduced image of the binary values.

The case of reducing the image size to ½ in the vertical and lateral directions will now be described as an example for convenience of explanation. In FIG. 5, reference pixels to be filtered by the LPF in the image of the original size are shown by being surrounded by a bold frame line, in which a pixel 310$f$ is set to a center pixel. The values of pixels 310$f$, 310$a$ to 310$c$, 310$e$, 310$g$, and 310$i$ to 310$k$ are $x_0$ to $x_8$ as shown in FIG. 5, respectively. An output $X_0$ of the LPF 302 is expressed as shown in the equation (2) by using $x_0$ to $x_8$:

$$x_0 = \frac{1}{16}(x_1 + 2x_2 + x_3 + 2x_4 + 4x_0 + 2x_5 + x_6 + 2x_7 + x_8) \quad (2)$$

Among the results of the outputs of the LPF, the results at the positions indicated by a mark ○ in FIG. 5 are sub-sampled by the sub-sampling unit 303, so that the reduced image of ½ can be obtained.

On the other hand, in recent years, since the sequential reproduction encoding system is effective for retrieval of the data base or the like, a hierarchy encoding as shown in FIG. 6 is executed. The image in a frame memory 101 to store the image of the original size is reduced by using a reducing apparatus 102 and the reduced image is stored into a frame memory 103. A reducing apparatus 104 receives the reduced image from the frame memory 103 and further reduces it and the reduced image is then stored into a frame memory 105. By using those reduced images, an encoder 108 encodes the smallest image stored in the frame memory 105 and transmits the encoded image. Next, efficient encoding is executed by an encoder 107 by using both the smallest image stored in the frame memory 105 and the image stored in the frame memory 103, and the result is transmitted. Finally, the images in the frame memories 101 and 103 are encoded by using an encoder 106 and the result is transmitted. In this manner, the information of all resolutions is transmitted. Generally, the same type is used as the reducing apparatuses 102 and 104.

However, according to the above reducing system, in the case where the image is a character image including many thin lines or the like, in the reduced image, the thin lines are cut out or not regenerated, so that the image quality is remarkably deteriorated. In addition, the reproducibility of a pseudo-gradation image by a dither method or an error diffusion method is not so good, as well.

That is, the construction of FIG. 4 to reduce a binary image will now be described as an example for simplicity of explanation. For an oblique thin line as shown in FIG. 7A, if the low pass filtering using the reference pixels in FIG. 5, the sub-sampling of the pixels shown by the mark ○, and the binarization using the threshold value of 0.5 are executed, such an oblique thin line is not regenerated because the output value of the LPF is "0.37" at most. On the other hand, a thin line as shown in FIG. 7B is regenerated if the positions of the pixels to be sub-sampled are located on the thin line. However, if those positions are elsewhere, such a thin line is not regenerated, in a manner similar to the case of FIG. 7A.

SUMMARY OF THE INVENTION

The present invention is made in consideration of the above points and it is an object of the invention to provide an image reducing apparatus which can obtain a reduced image without losing the image content of an image of an original size.

Another object of the invention is to provide an image reducing apparatus for executing a reducing process suitable for an image of an original size to be reduced.

Still another object of the invention is to provide an image reducing apparatus for executing a reducing process suitable for the content of an image in consideration of an image around an object pixel (a pixel of interest) to reduced and of a peripheral reduced image.

Still another object of the invention is to provide an image reducing apparatus suitable for hierarchy encoding.

The above and other objects, features, and advantages of the present invention will become apparent from the following detailed description and the appended claims with reference to the accompanying drawings.

BRIEF DESCRIPTION OF THE DRAWINGS

FIG. 1 is a block diagram showing the concept of the image reduction according to a conventional projecting method;

FIGS. 2A to 2C are diagrams for explaining a block extraction according to the projecting method;

DETAILED DESCRIPTION OF THE PREFERRED EMBODIMENTS

Several preferred embodiments of the present invention will be described hereinbelow.

Figure 8:
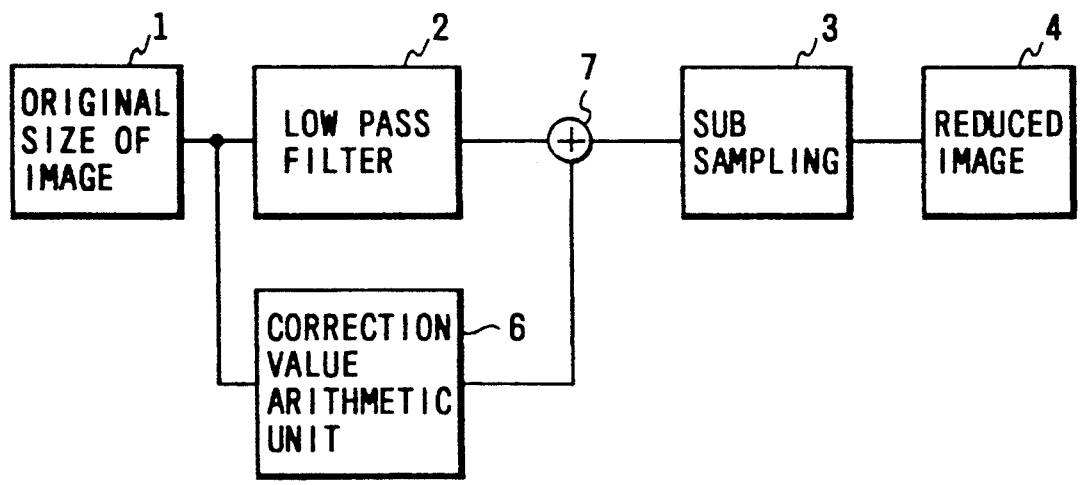
FIG. 8 is a block diagram showing the first embodiment of an image reducing apparatus embodying the invention.

FIG. 8 is a block diagram of an image reducing apparatus to which the invention is applied.

Reference numeral 1 denotes an image of an original size which is input; 2 indicates a low pass filter (LPF); 3 a sub-sampling unit; 4 a reduced image obtained; 6 a correction value arithmetic unit for obtaining structure information from the low pass filtered reference pixels of the image of the original size which was input, for discriminating the necessity of the correction, and for calculating a correction value; and 7 an adder.

Explanation will now be made on the assumption that the values of the pixels of the image 1 of the original size which is input are expressed by eight bits, indicating values from 0 to 255, and the reduction size is set to ½. The input image 1 is supplied to the LPF 2 on a 3-line unit basis. The smoothed image is obtained by the matrix arithmetic operation of $3\times3$ by equation (2).

Figure 9:
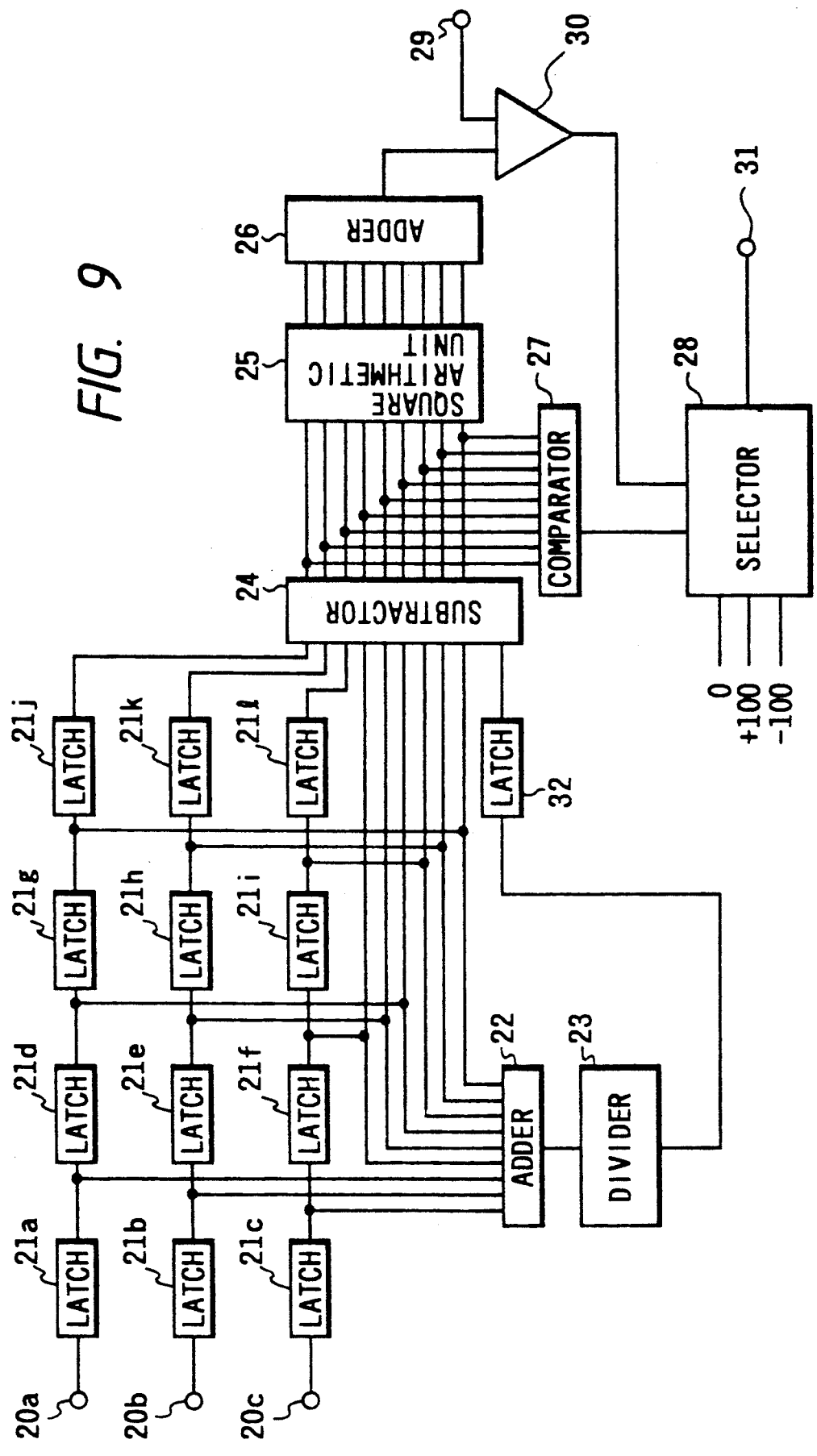
FIG. 9 is a block diagram of a correction value arithmetic unit in the first embodiment.

The image 1 is also input to the correction value arithmetic unit 6. FIG. 9 shows a block diagram of the correction value arithmetic unit 6.

Reference numerals 20a to 20c denote terminals to input reference pixels which are input to the LPF 2 every line. Reference numerals 21a to 21l indicate latches for latching the values of the input pixels and shifting data to the right at predetermined timings; 22 and 26 adders each for adding nine inputs; 23 a divider to divide the input by the number of reference pixels; 32 a latch to latch data; 24 a subtracter for receiving nine minuends and subtracting the number which was separately input from the nine minuends and outputting the results, respectively; 25 a square arithmetic unit to output the square numbers of the nine inputs, respectively; 27 a comparator for outputting the code of the input having the largest absolute value among nine inputs; 29 an input terminal; 30 a comparator for comparing two inputs and discriminating the magnitudes thereof; 28 a selector for receiving two selection signals, switching among three inputs, and outputting the selected input signal; and 31 an output terminal.

At the time when the pixel data which were input from the terminals 20a to 20c were stored in the latches 21a to 21i, the adder 22 obtains the total of the values of the nine pixels and outputs the result to the divider 23. The divider 23 divides the total of the pixel values by the total number of pixels (=9), thereby obtaining the mean value. At the next timing, the reference pixel block is shifted to the latches 21d to 21l and the mean value which has already been obtained by the divider 23 is latched in the latch 32. The subtractor 24 obtains the difference between each of the pixel value in the latches 21d to 21l and the mean value in the latch 32 and outputs to the square arithmetic unit 25 and comparator 27.

The comparator 27 detects the maximum one of the nine differences which were input and outputs one bit indicative of the sign of the maximum difference detected (the positive sign is set to "0" and the negative sign is set to "1"). That is, when the maximum difference is positive, this means a black thin line and a block including an isolated point. When it is negative, this means a white thin line and a block including an isolated point. The square arithmetic unit 25 respectively squares the nine inputs and obtains the square differences. The adder 26 obtains the sum of the square differences. The comparator 30 compares the value e.g 100,000, which was input from the input terminal 29 with the sum of the square differences. If the sum is larger than the input value, "1" is output. If the sum is smaller than the input value, "0" is output. Namely, if the sum of the square differences is larger, it is determined that the information to be preserved exists in the block.

The selector 28 switches three inputs and outputs. The three inputs are set to 0, +100, and -100. When the output of the comparator 30 is set to "1", the correction is executed. When it is "0", correction is not executed. In the case of executing the correction, if the sign of the output of the comparator 27 is negative, that is, "1", negative correction is executed. If it is positive, namely, "0", positive correction is performed. Therefore, in the case where correction is not executed, an output of the selector 28 is set to 0. In the case of executing negative correction, it is set to −100. When performing positive correction, it is set to +100. Those results are output to the adder 7 in FIG. 8 from the terminal 31.

In FIG. 8, the adder 7 adds the output of the LPF 2 and the correction value from the correction value arithmetic unit 6 and obtains the values of the reduced pixels, thereby obtaining the reduced image 4 which was reduced to ½ in the vertical and lateral directions by the sub-sampling unit 3.

As mentioned above, in the first embodiment, the structure information in the reference pixel block which is referred by the LPF 2 is extracted, the thin line or the like is detected, and the output of the LPF 2 is corrected. Therefore, the thin lines such as characters or the like which will be extinguished or faded if only the LPF 2 is used can be preserved and a reduced image can be obtained.

Figure 10:
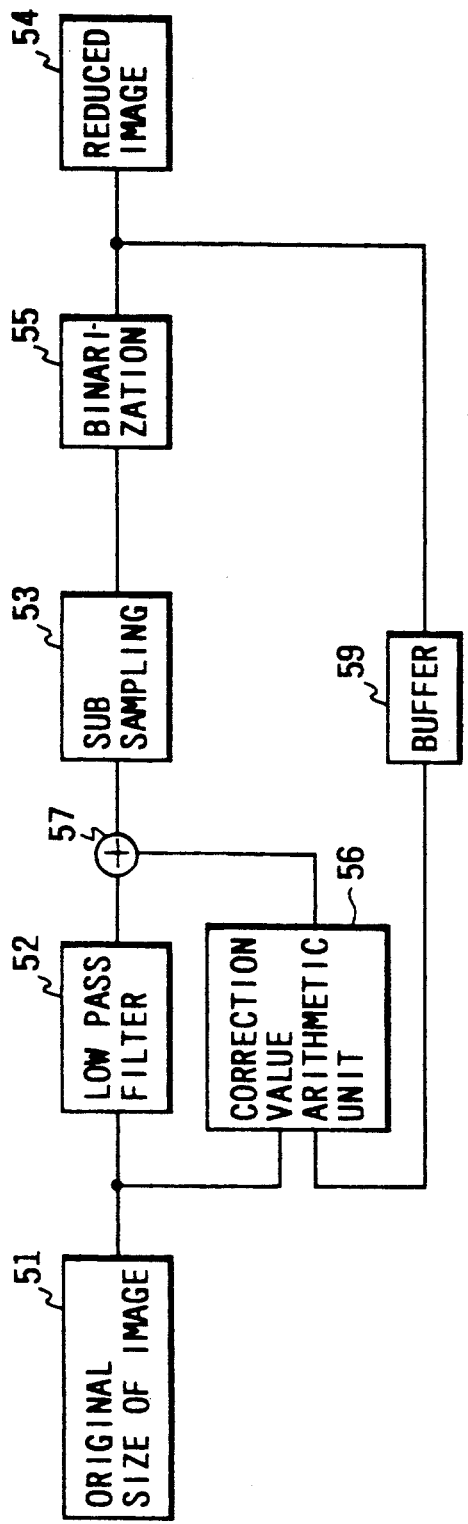
FIG. 10 is a block diagram showing the second embodiment of an image reducing apparatus embodying the invention.

FIG. 10 is a function block diagram of the second embodiment of the invention. Reference numeral 51 denotes an image of an original size; 52. indicates a low pass filter (LPF); 56 a correction value arithmetic unit for discriminating the necessity of the correction and calculating a correction value; 57 an adder; 53 a subsampling unit; 55 a binarization unit; 59 a buffer to store a part of the reduced image; and 54 a reduced image obtained.

Explanation will now be made on the assumption that the value of each pixel of the image 51 of the original size which is input is a binary value of "0" (white) or "1" (black) and the reduction ratio is set to ½. The input image 51 is supplied to the LPF 52 on a -3line unit basis and a smoothed image is obtained by the equation (2) mentioned above. The image 51 of the original size is also input to the correction value arithmetic unit 56.

Figure 11:
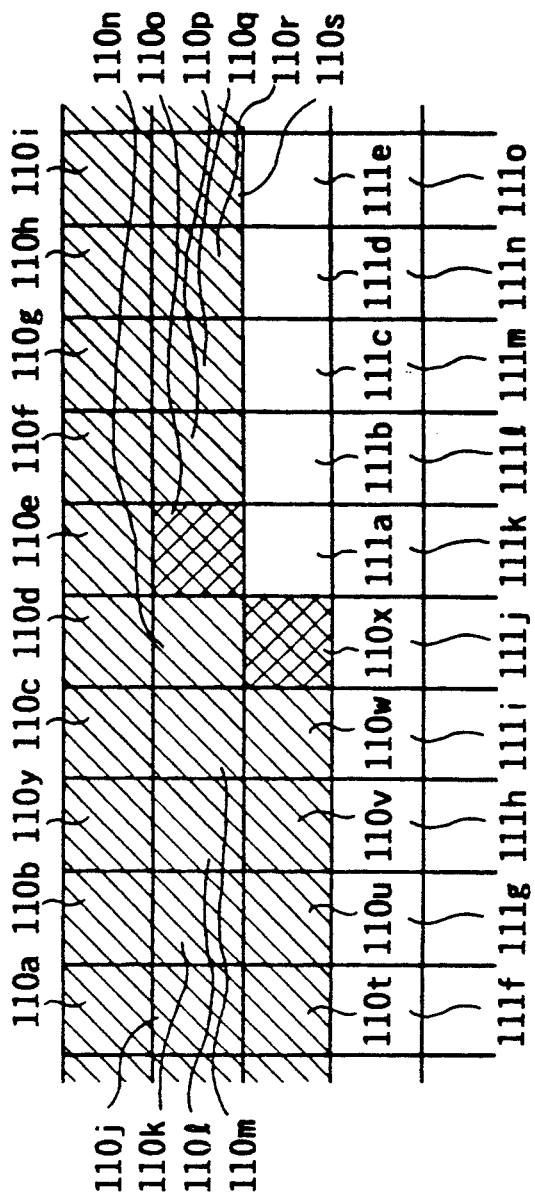
FIG. 11 is a diagram showing the positions of peripheral reduced pixels.

In the reduced image which has already been reduced, the reduced pixels which have already been reduced of the previous raster and of the raster which is being processed are temporarily stored in the buffer 59. Among the reduced pixels, as shown in FIG. 11, both of a value of a reduced pixel 110x obtained just before the reduced pixel to be obtained and a value of a reduced pixel 110o at the same position as the previous raster are also input to the correction value arithmetic unit 56. Hatched pixels 110a to 110x in FIG. 11 denote reduced pixels which have already been obtained and a pixel 111a indicates a reduced pixel to be obtained.

Figure 12:
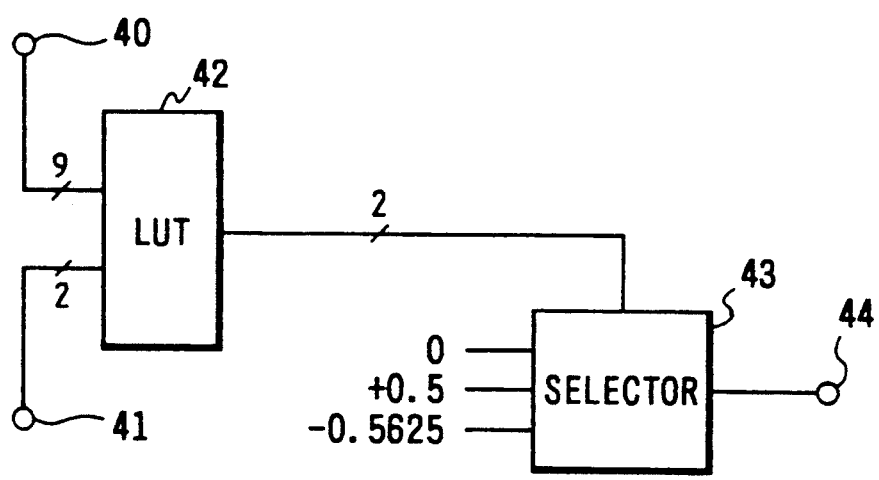
FIG. 12 is a block diagram of a correction value arithmetic unit in the second embodiment.

At this time, the reduced pixels 110o and 110x are input to the arithmetic unit 56. FIG. 12 shows a block diagram of the correction value arithmetic unit 56. Reference numeral 40 denotes an input terminal to input the reference pixel information of the low pass filter; 41 an input terminal to input information of peripheral reduced pixels from the buffer 59; 42 a look-up table (LUT) comprising a read only memory (ROM); 43 a selector for switching one of three inputs and outputting; and 44 an output terminal.

The reference pixels (nine pixels) which were input from the input terminal 40 and the peripheral reduced pixels (two pixels) which were input from the input terminal 41 are input as addresses of the LUT 42. The necessity of the correction is discriminated from the input 11-bit information and in the case of correcting, information of two bits indicative of either negative correction or positive correction is previously stored into the LUT 42.

Figure 13A:
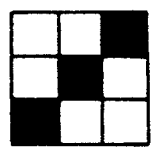
FIGS. 13A to 13C are diagrams showing examples of reference pixel blocks to be corrected.
Figure 13B:
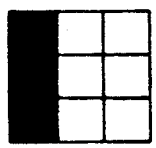
Figure 13C:
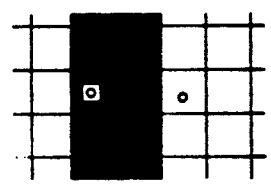

For instance, when a reference pixel as shown in FIG. 13A was input, the reduced pixel value $X_0$. which is calculated by the LPF 52 on the basis of the equation (2) is set to 0.375. If the threshold value T is set to 0.5, the reduced pixel is set to white. However, in the case of considering the continuity of a line segment, the reduced pixel must be black because of the necessity of the preservation of the information in the reduced image. On the other hand, in the case where a reference pixel as shown in FIG. 13B was input as well, the reduced pixel must be similarly black in consideration of the continuity of a line segment. However, in the case of FIG. 13C, if the pixel indicated by the mark o to be sub-sampled is set to the center pixel of the reference pixel block, the result of the projecting method becomes black for the reference pixel block on the left side of the center pixel and it becomes black in the case of the reference pixel block on the right side due to the above reason. In such a case, there occurs a problem such that the line segment of the width of two pixels of the image of the original size also corresponds to the width of two pixels even when the reduced image is obtained. To avoid such a problem, no correction is executed to the projecting method for the reference pixel block on the right side. That is, even if the structures of the reference pixel blocks are substantially the same structure, both pixels which are corrected and pixels which are not corrected exist in dependence on the situation of the peripheral pixels. In the case of the reference pixel block as shown in FIG. 13B, if the reduced pixel just before is white, positive correction is executed. If it is black, correction is not executed. Such information is decided in advance and stored into the LUT 42. The meanings shown by two bits of an output of the LUT 42 are as shown in Table 1.

TABLE 1

| Bits | Meaning |
| --- | --- |
| 00 | No correction |
| 01 | Positive correction |
| 10 | Negative correction |
| 11 | Not used |

In accordance with the output of the LUT 42, the selector 43 switches three inputs and outputs. Three kinds of inputs of 0, +0.5, and −0.5625 are provided. If the input indicates no correction, 0 is output. In the case of executing the positive correction, +0.5 is selected. In the case of performing the negative correction, −0.5625 is selected. The selected value is output from the terminal 44 to the adder 57 in FIG. 10 as a correction value. In FIG. 10, the adder 57 adds the output of the LPF 52 and the correction value, thereby obtaining the values of the reduced pixels. The numbers of pixels in the vertical and lateral directions are reduced to ½ by the sub-sampling unit 53. The reduced pixel values are input to the binarization unit 55 and are compared with the threshold value T=0.5, so that the reduced binary image 54 is obtained. The result is also output to the buffer 59 and is fed back to the correction value arithmetic unit 56.

As mentioned above, in the second embodiment, a feature of the pixel block to be processed by the LPF is decided by using both of the structure information in the reference pixel block of the LPF and the information of the reduced pixels which have already been derived. The thin lines which will be extinguished in the case of processing by using only the low pass filter are preserved in accordance with the feature decided, and the thickening of the thin lines which is caused due to the decision based on only the structure information in the reference pixel block can be prevented.

Figure 14:
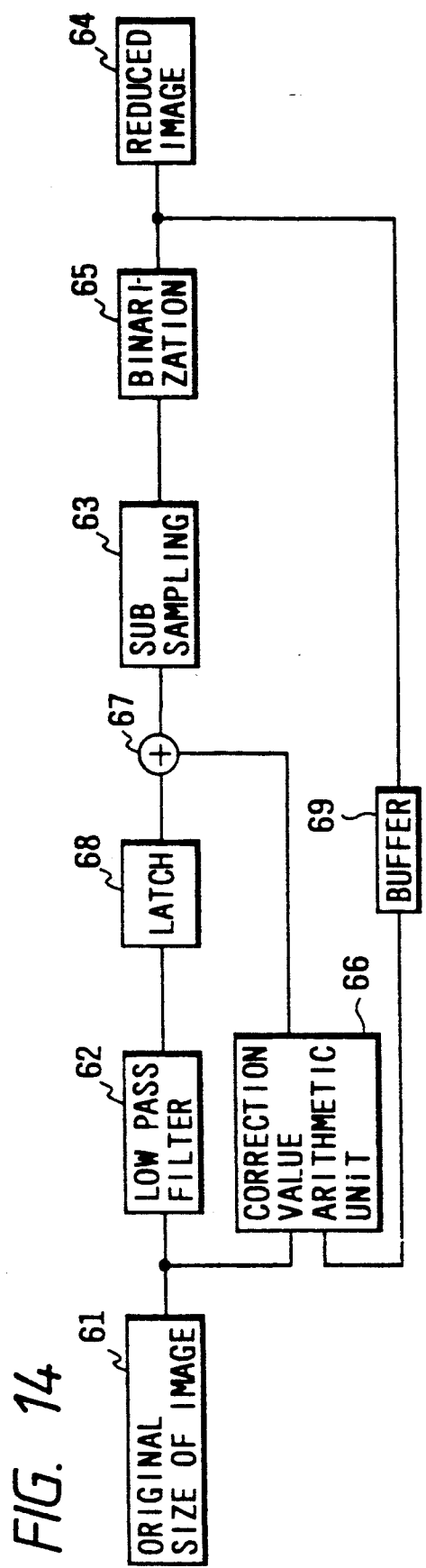
FIG. 14 is a block diagram showing the third embodiment of an image reducing apparatus embodying the invention.

FIG. 14 is a function block diagram of the third embodiment of the invention.

Reference numeral 61 denotes an image of an original size which is input; 62 indicates a low pass filter; 68 a latch to adjust the timing; 66 a correction value arithmetic unit for deciding the necessity of the correction and calculating a correction value; 67 an adder; 63 a sub-sampling unit; 65 a binarization unit; 64 a reduced image obtained; and 69 a buffer to store a part of the reduced image.

Explanation will now be made on the assumption that the values of the pixels of the image 61 of the original size which is input are binary values of 0 (white) or 1 (black) and the reduction ratio is set to ½. The input image 61 is supplied to the low pass filter 62 on a 3-line unit basis. The image value of the smoothed image is obtained by the equation (2) and latched into the latch 68. The output result of the low pass filter 62, the reference pixel block, and the peripheral reduced pixels 110o and 110x as shown in FIG. 11 among the reduced pixels which have already been reduced from the buffer 69 are simultaneously input to the correction value arithmetic unit 66.

Figure 15:
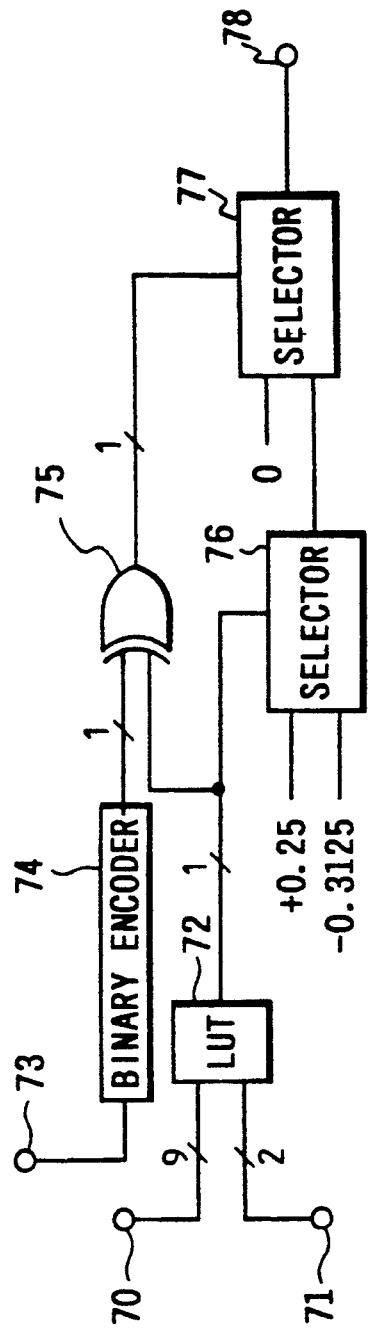
FIG. 15 is a block diagram of a correction value arithmetic unit in the third embodiment.

FIG. 15 shows a block diagram of the arithmetic unit 66. Reference numeral 70 denotes a terminal to input the reference pixel information of the low pass filter; 71 indicates an input terminal to input the information of the peripheral reduced pixels from the buffer 69; 72 a look-up table (LUT) comprising a ROM; 73 an input terminal to input the result of the LPF; 74 a binary encoder to binarize an input value on the basis of the threshold value T=0.5; 75 an exclusive OR circuit; 76 and 77 selectors of two inputs and one output; and 78 an output terminal.

The reference pixels (nine pixels) which were input from the input terminal 70 and the peripheral reduced pixels (two pixels) which were input from the input terminal 71 are input as addresses of the LUT 72. The results, which have been predetermined with respect to each case from the input 11-bit information in a manner such that, in the case where correction is unnecessary, the result which was binarized without any correction is derived, while in the case where correction is needed, the result which was binarized after completion of the correction is derived, are stored in the LUT 72. When explaining the examples of FIGS. 13A and 13B, in the case of FIG. 13A, "1", namely, black is output irrespective of the peripheral reduced pixels. In the case of FIG. 13B, "0" (white) is output when the result of the reduced pixel on the left side is "1" (black), while "1" (black) is output when the result is "0" (white).

The output of the LPF is input from the input terminal 73 and is binarized by the binary encoder 74. The exclusive OR circuit 75 checks to see if the outputs of the binary encoder 74 and the LUT 72 are different or not, that is, whether the correction is necessary or not. When an output of the exclusive OR circuit 75 is 0, the correction is not executed. When it is 1, the correction is performed. The selector 76 is a 2-input and 1-output selector. When the result of the LUT 72 is 0, the negative correction value, namely, −0.3125 is output. When it is 1, the positive correction value, namely, +0.25 is output. Those correction values are determined in the following manner.

When it is assumed that among the reference pixel blocks to be subjected to positive correction, the output of the LPF is the smallest (0.25) and the differential value between the output value and the threshold value T=0.5 is the largest with respect to the block expressed by the reference pixel block shown in FIG. 13B, the positive correction value is set to 0.25. On the contrary, the negative image of FIG. 13B similarly needs to be subjected to negative correction. When it is assumed that among the reference pixel blocks to be subjected to negative correction, the output of the LPF is the largest (0.75) and the differential value with the threshold value T (=0.5) is the largest, the negative correction value is set to −0.3125 because the value after completion of the correction is lower than 0.5.

The selector 77 switches the correction value which was determined as mentioned above and the output 0 of the correction value in the case of no correction on the basis of the output of the exclusive OR circuit 74. The switched value is output from a terminal 78 to the adder 67 in FIG. 14.

In FIG. 14, the adder 67 adds the output of the LPF and the correction value and obtains the values of reduced pixels. The numbers of pixels in the vertical and lateral directions are reduced to ½ by the sub-sampling unit 63. The reduced pixel values are input to the binarization unit 65 and compared with the threshold value T=0.5, so that the reduced binary image 64 is obtained. The result is also output to the buffer 69 and is used as information to discriminate the necessity of the subsequent correction of the pixels.

As mentioned above, according to the third embodiment, by using the structure information in the reference pixel block of the low pass filter and the information of the reduced pixels which has already been obtained and, further, by using the output of the LPF, the thin lines which will be extinguished in the case of using only the LPF are preserved and the thickening of thin lines which is caused due to the decision based on only the structure information in the reference pixel block are prevented. Moreover, by changing the weight coefficient of the LPF and the threshold value for the binarization, the image quality and the concentration can be controlled.

The sub-sampling method in each of the above embodiments is not limited to the foregoing method. It is also possible to select the center pixel position of the LPF and to simultaneously execute the low pass filtering and the sub-sampling. Each correction value and the threshold value for the binarization are not limited to the foregoing values. The shape and weight coefficients of the LPF are not limited to the foregoing values. A method of extracting the structure information in the first embodiment is not limited to the foregoing method. The structure information can be also extracted by using a Laplacian filter, an orthogonal transformation, or the like. The characteristics of the image of the original size and the reduction ratio are also not limited to those mentioned above. The positions of the peripheral reduced pixels to be referred are not limited to the foregoing positions.

As described above, by correcting the output value of the low pass filter on the basis of the structure information of the reference pixels of the low pass filter and, as necessary, the output result of the LPF and the information of the reduced pixels which have already been obtained, the fading or extinction of the thin lines in the reduced image is prevented. The thin lines are regenerated as they are. Thus, the information can be preferably preserved and the image quality can be improved. On the other hand, by changing the threshold value for the binarization, there is also an advantage such that the concentration can be adjusted with the image quality held. Further, even in the case where the reduction is repeated a number of times and the further smaller reduced image is obtained, the information can be preferably preserved.

Figures 16, 17A, 17B, 17C:
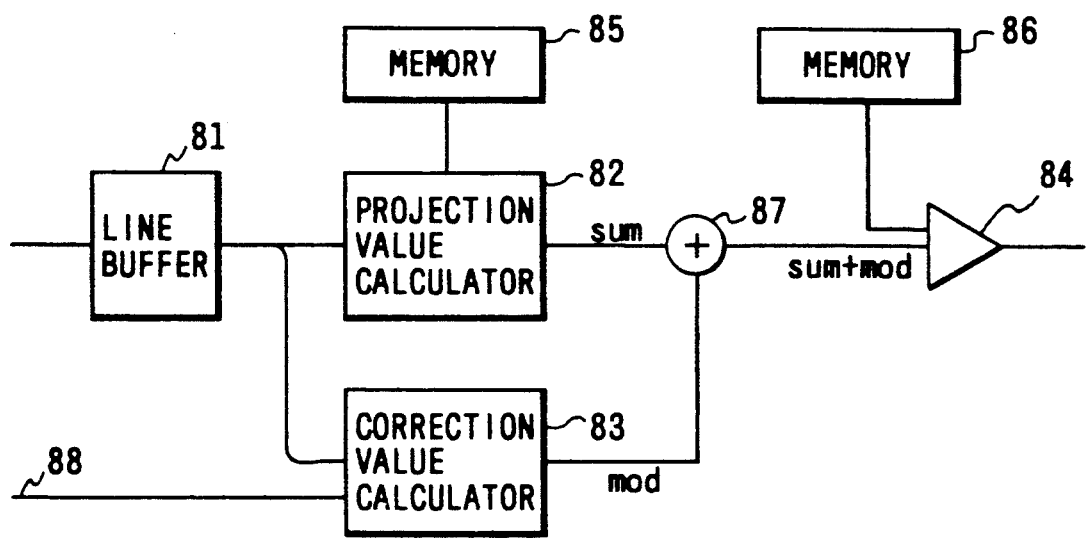
FIG. 16 is a block diagram of the fourth embodiment of an image reducing apparatus embodying the invention.
FIGS. 17A to 17C are diagrams showing examples of projection matrices and input data of the projecting method.

FIG. 16 shows the fourth embodiment according to the invention. Reference numeral 81 denotes a line buffer to extract the input binary image data on a block unit basis of 3×3 pixels; 82 indicates a projection value calculator to calculate a projection value in accordance with the matrix of the low pass filter which is stored in a memory 85; 83 a correction value calculator for detecting a special pattern and outputting a correciton value; 87 an adder; 84 a comparator for binarization to binarize an output of the adder 87 on the basis of a threshold value stored in a memory 86; and 88 an input line of reference data other than the block data of 3×3. The block data $D_{1,1}$ to $D_{3,3}$ (FIG. 2B) of 3×3 which are output from the line buffer 81 are input to the projection value calculator 82 and the correction value calculator 83. The projection value calculator 82 calculates the projection value sum by the following equation in accordance with matrix values $a_{1,1}$ to $a_{3,3}$ as shown in FIG. 2C in the memory 85:

$$\text{sum} = \sum_i \sum_j D_{i,j} \times a_{i,j} \quad (3)$$

The correction value calculator 83 uses the block data $D_{1,1}$ to $D_{3,3}$ from the line buffer 81 and the reduced pixels which have already been obtained as reference pixel data and outputs a correction value mod in accordance with those data. The adder 87 adds the values of sum and mod, thereby obtaining a correction projection value (sum +mod). (sum +mod) is binarized by the comparator 84 on the basis of the threshold value in the memory 86 and 1 or 0 is output.

The contents of the threshold value memory 86 and matrix memory 85 are variable and are used for adjustment of the image quality of the reduced image. For instance, assuming that a concentration parameter is set to $\rho$, the matrix values $a_{1,1}$ to $a_{3,3}$ as shown in FIG. 2C are expressed by the following equation:

$$a_{i,j}(\rho) = \frac{\left(\sum_i \sum_j a_{i,j} + \rho\right)}{\sum_i \sum_j a_{i,j}} a_{i,j}(0) \quad (4)$$

$a_{i,j}(0)$ is set to a function of $\rho$ in a form like a preset value.

In the ordinary projecting method such that the matrix of the low pass filter of the projecting method has a form as shown in FIG. 17A and the threshold value is set to 8, projection values of 4 and 6 are obtained for input images as shown in FIGS. 17B and 17C, respectively. Therefore, since the threshold value is 8, both of the reduced data are set to 0 (white), causing the thin lines to be extinguished. Therefore, correction is performed so that both of them are set to 1 (black). In this case, it is sufficient to select a correction value of 4 or more for FIG. 17B and a correction value of 2 or more for FIG. 17C.

Patterns such that the preferable correction is not executed in the case where the correction is performed on the basis of the ordinary projecting method such as FIGS. 17B and 17C, or the like assume a correction objective pattern (pattern to be corrected). As an example of such a pattern, the patterns as shown in FIGS. 17B and 17C, and the like are provided to prevent the extinction of the thin lines. In addition to them, a pattern to preserve the half-tones or the like can be mentioned. The correction value calculator 83 is provided to detect the input of such a pattern when it is input and to output a correction value.

In addition to the matrix of the projecting method which is input to the correction value calculator 83, as shown in FIG. 11, both the value of the reduced pixel 110x obtained just before the reduced pixel to be obtained and the value of the reduced pixel 110o at the same position as the previous raster among the reduced pixels which have already been obtained, are input to the calculator 83.

In FIG. 11, the hatched pixels 110a to 110x are the reduced pixels which have already been obtained. Reference numeral 111a indicates the reduced pixel to be obtained. At this time, the reduced pixels 110o and 110x are input to the arithmetic unit 83.

Figure 18:
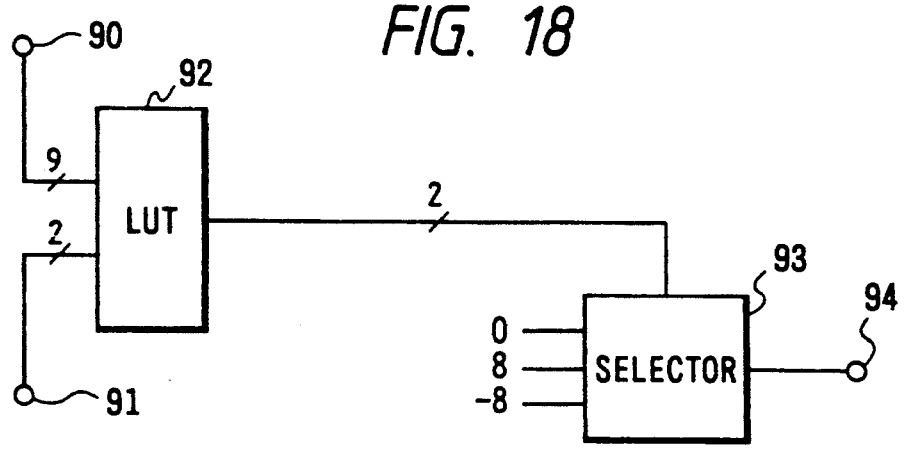
FIG. 18 is a block diagram of a correction value arithmetic unit.

FIG. 18 shows a block diagram of the correction value calculator 83. Reference numeral 90 denotes an input terminal to input block data of a matrix; 91 indicates an input terminal to input the information of the peripheral reduced pixels from the reference data input line 88; 92 a look-up table (LUT) comprising a read only memory (ROM); 93 a selector for selecting one of three inputs and outputting; and 94 an output terminal. The block data (nine pixels) which was input from the input terminal 90 and the peripheral reduced pixels (two pixels) which were input from the input terminal 91 are input as addresses of the LUT 92. Information of two bits indicative of either negative correction or positive correction in the case of executing correction by discriminating the necessity of the correction on the basis of the input 11-bit information, is stored in advance in the LUT 92.

The meanings which are expressed by two bits of the output of the LUT 92 are as shown in Table 2.

TABLE 2

| Bits | Meaning |
| --- | --- |
| 00 | No correction |
| 01 | Positive correction |
| 10 | Negative correction |
| 11 | Not used |

In accordance with an output of the LUT 92, the selector 93 switches three inputs and outputs. Three kinds of inputs of 0, +8, and −8 are provided. In the case where the input indicates no correction, 0 is output. In the case of positive correction, +8 is selected. In the case of performing negative correction, −8 is selected. The selected value is output as a correction value mod from the terminal 94 to the adder 87 in FIG. 16.

According to the fourth embodiment, the extinction of thin lines which is caused in the case of using only the projection method using the low pass filter can be prevented by executing positive or negative correction on the projection value in the case of a predetermined special pattern.

Figure 19:
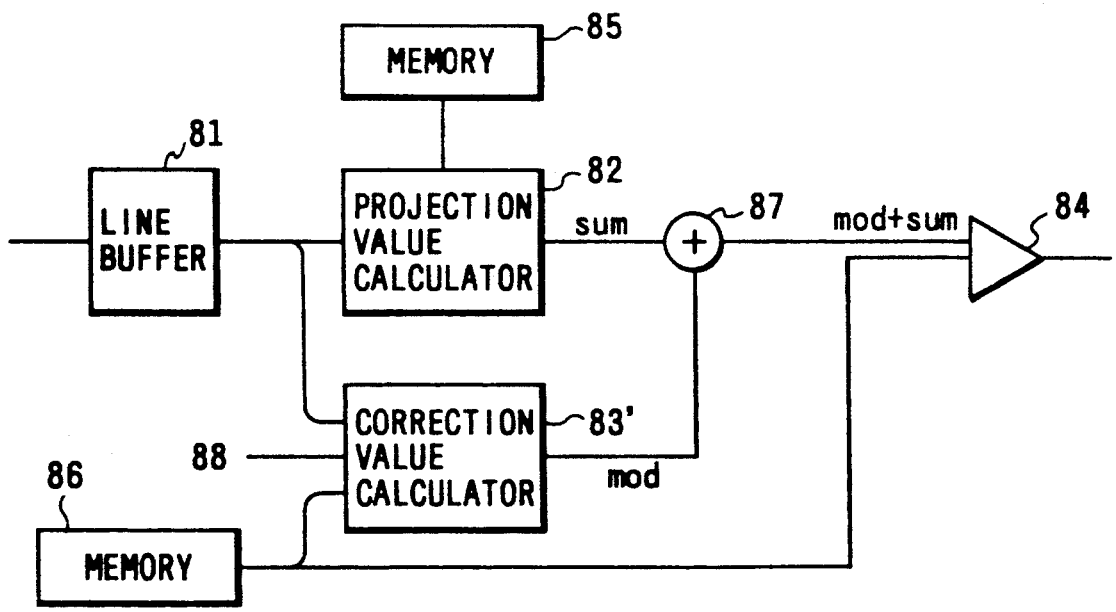
FIG. 19 is a block diagram showing the fifth embodiment of an image reducing apparatus embodying the invention.

FIG. 19 shows the fifth embodiment according to the invention. Reference numeral 81 denotes the line buffer for extracting the input binary image data on a block unit basis of 3×3; 82 indicates the projection value calculator to calculate a projection value in accordance with a matrix of the low pass filter stored in the memory 85; 83' a correction value calculator to detect a special pattern and output a correction value; 87 the adder; 84 the comparator for binarization to binarize an input data in accordance with the threshold value stored in the memory 86; and 88 the input line of the reference data other than the block data of 3×3.

The block data $D_{1.1}$ to $D_{3.3}$ of 3×3 which are output from the line buffer 81 are input to the projection value calculator 82 and the correction value calculator 83. The projection value calculator 82 calculates a projection value by equation (3) on the basis of the matrix values a1.1 to a3.3 in the memory 85.

The correction value calculator 83' outputs the correction value mod in accordance with the data $D_{1.1}$ to $D_{3.3}$ and, as necessary, the reduced pixels and the other reference pixel data which are input from the reference data input line 88, and the threshold value in the memory 86. The correction value which is output here is a function of the threshold value T stored in the memory 86 and such a function assumes f(T). That is, in the fourth embodiment, assuming that a correction value M(A) was output for a certain input pattern A, the correction value in the embodiment for the same pattern A is set to f(T)×M(A).

On the other hand, the content of the matrix memory 85 is variable and is used to adjust the image quality of the reduced image. The values $a_{1.1}$ to $a_{3.3}$ of the matrix are the function of the concentration parameter ρ as shown in equation (4).

Figure 20A:
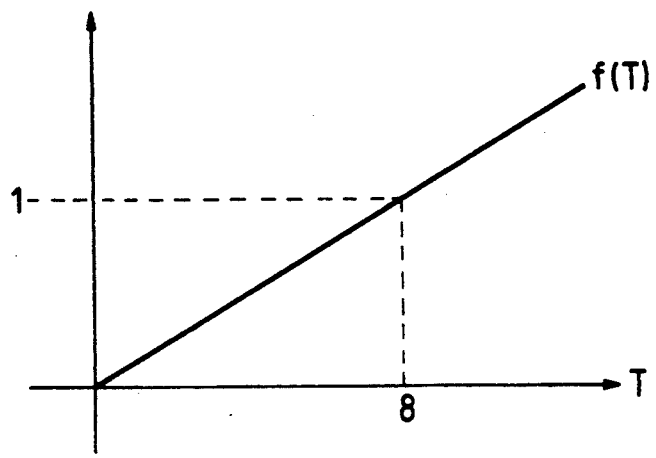
FIGS. 20A and 20B are diagrams showing examples of shapes of functions f using a threshold value as a variable.
Figure 20B:
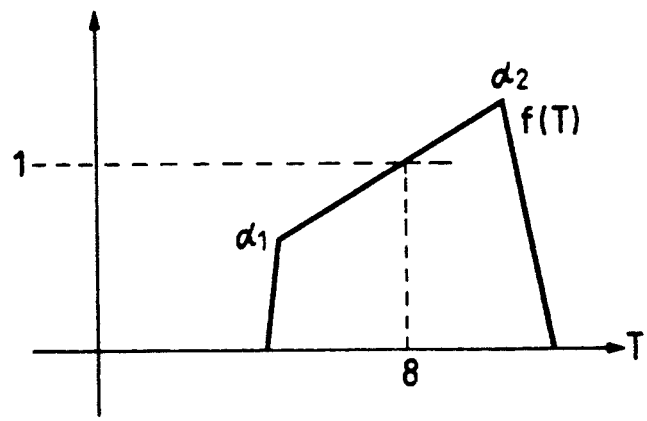

The correction value f(T) has a form as shown in, for instance, FIG. 20A or 20B.

At this time, although the magnitude of the correction value can be controlled due to a change in threshold value T, since the threshold value varies, the concentration of the image also changes. On the other hand, since the concentration can be independently adjusted by a change in ρ, by simultaneously changing both ρ and T, the effective degree of the correction and the image concentration can be adjusted, respectively. FIG. 20A shows the case where the value of f(T) is simply increased with an increase in T. FIG. 20B shows the case where the increase or decrease in value of f(T) is adaptively controlled in accordance with a change range of the value of T.

Figure 3:
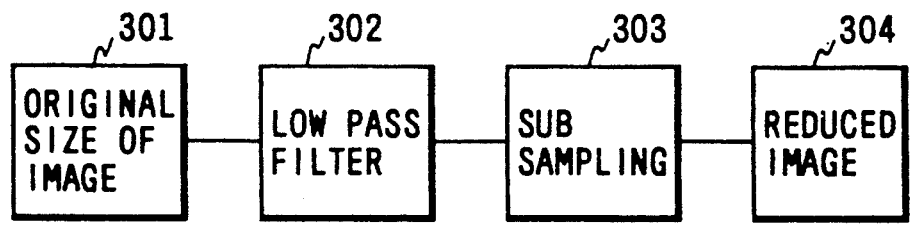
FIGS. 3 and 4 are block diagrams showing the functions of image reducing apparatuses in the conventional examples.
Figure 4:
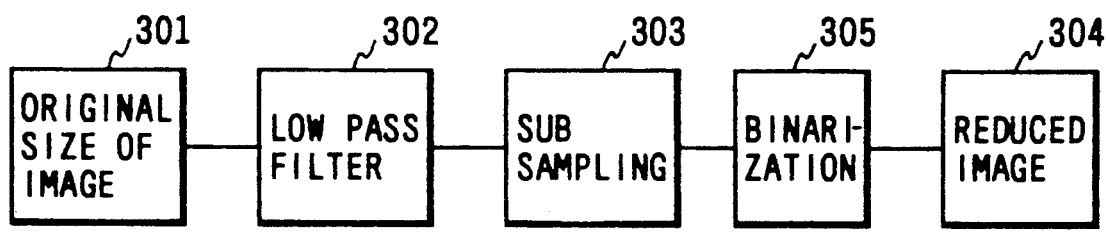
Figure 5:
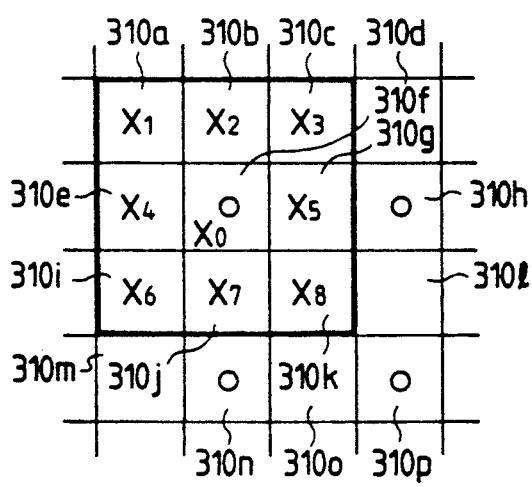
FIG. 5 is a diagram showing a matrix of a low pass filter in the case of a reduction ratio of ½.
Figure 6:
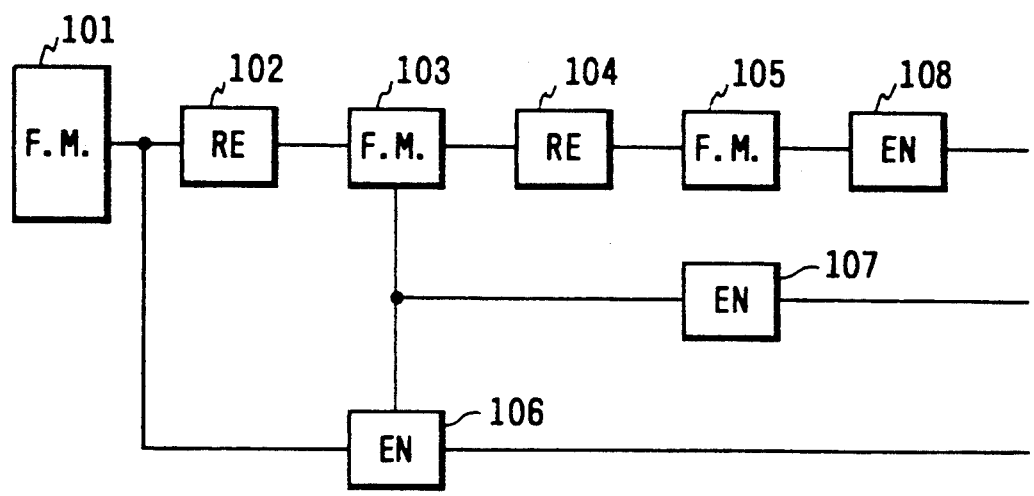
FIG. 6 is a diagram showing a conventional example of a sequential encoder.
Figure 7A:
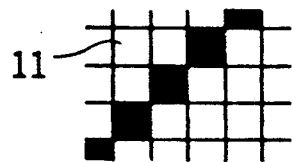
FIGS. 7A and 7B are diagrams showing a problem in the conventional example.
Figure 7B:
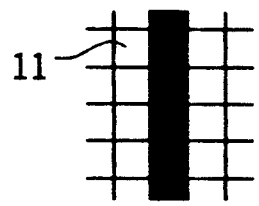

If the reducing operation having the correcting function as shown in the above embodiment is applied to the sequential regeneration encoding system as shown in FIG. 6, there is a tendency that as the image is reduced, even for a high order reduced image, the corrected reduced pixels preserve the information as well. That is, if the image has once been regenerated as thin lines, they also remain as thin lines even in the high order reduced image. Therefore, in such a portion, the statistical characteristics as an image are lost by the correction and a deterioration occurs as noises. In such a case, it is preferable to paint out the image in white or black in order to eliminate the noise.

Figures 21, 22:
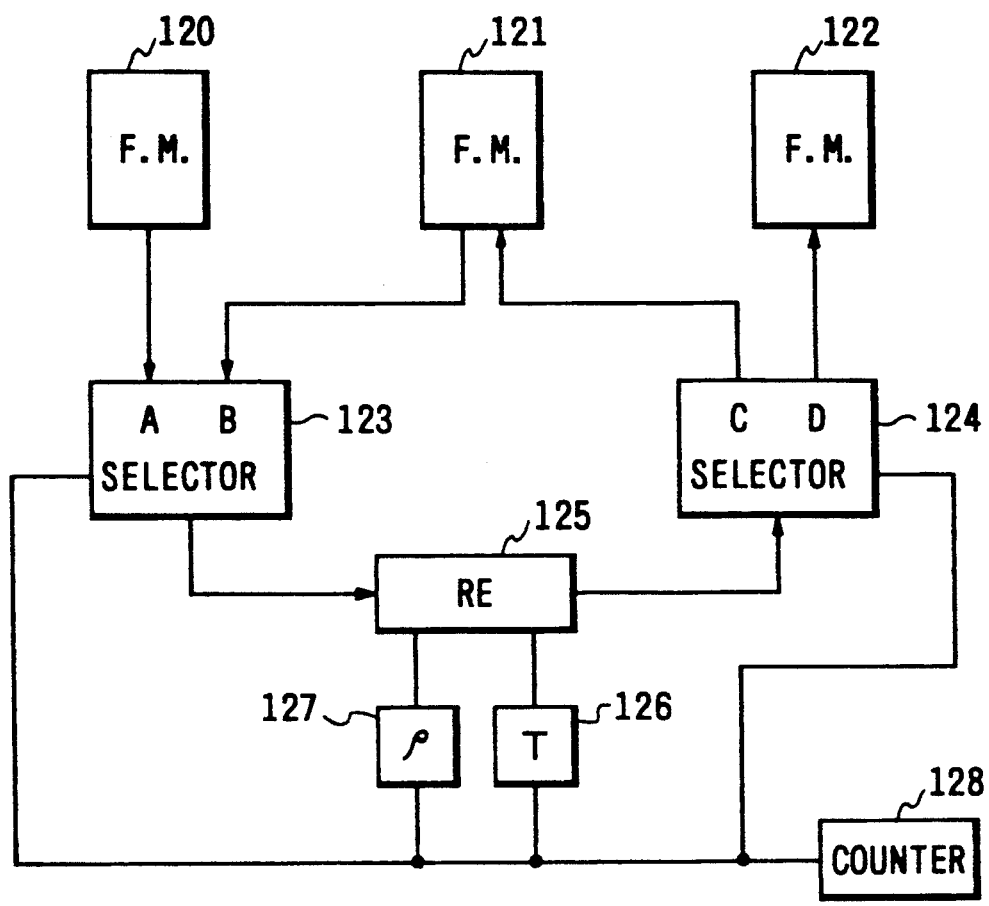
FIG. 21 is a block diagram for explaining the sixth embodiment embodying the invention.
FIG. 22 is a diagram showing a projection matrix which is used in the sixth embodiment.

FIG. 21 is a block diagram showing a construction of the sixth embodiment. Reference numeral 120 indicates a frame memory to store a full resolution image (image of an original size); 121 a frame memory to store a ½ reduced image; 122 a frame memory to store a ¼ reduced image; and 123 a selector. Assuming that inputs from the frame memories 120 and 121 are set to A and B, the selector 123 selects and outputs either A or B. Reference numeral 124 also denotes a selector. Assuming that outputs to the frame memories 121 and 122 are set to C and D, the selector 124 outputs the input signal to either C or D.

Reference numeral 125 denotes a reducing apparatus; 127 indicates a matrix memory; 126 a threshold value memory; and 128 a counter to obtain the number of use times of the reducing apparatus.

First, the counter 128 is reset to 0. Next, the selector 123 selects the input A in accordance with the input of 0 from the counter 128 in order to reduce the full resolution image of the original size. The selector 124 also selects the output C in accordance with the input of 0 from the counter 128. For convenience of explanation, it is assumed that the reducing apparatus 125 shown in the foregoing fifth embodiment (FIG. 19) is used.

The matrix memory 127 and threshold value memory 126 receive an output of the counter 128 and the memory 127 supplies a matrix as shown in FIG. 17A to the reducing apparatus 125. The memory 126 outputs a threshold value of "8". The ½ reduced image obtained as mentioned above is written into the frame memory 121. According to the ½ reduced image, the extinction of the thin lines is prevented by the foregoing correcting process.

Next, the count value of the counter 128 is counted up by "1" and is set to "1". Thus, the selector 123 selects the input B and the selector 124 selects the output D in order to further reduce the ½ reduced image. The matrix memory 127 outputs a matrix having a high smoothing degree as shown in FIG. 22 to the reducing apparatus 125. The threshold value memory 126 outputs a threshold value T=6 to the reducing apparatus 125. The threshold value T=6 is a value within a range between two vertex points $a_1$ and $a_2$ of the f(T) in FIG. 20B. Thus, in the resultant ¼ reduced image, when a special pattern to be corrected was input, the correction is executed. However, for a pattern which is not corrected, the smoothing degree is raised by the matrix and, further, the threshold value is set to a lower value, so that the image is painted out in black. On the other hand, it is assumed that the threshold value memory 126 outputted a threshold value T=4 and that the threshold value T=4 was located on the further left side than the left vertex point $a_1$ of the f(T) in FIG. 20B In this case, in the resultant ¼ reduced image, the pattern which is not corrected is further painted out in black than the case of the threshold value T=6 and a part of the pattern to be corrected cannot be also completely corrected and is painted out in black because the correction value is set to a small value.

As mentioned above, the noise generated by repetitively executing the reduction a plurality of number of times can be extinguished by changing the matrix content of the low pass filter and the threshold value for the binarization every reduction or every so many reduction times and the user can control the image quality according to the sixth embodiment.

As described above, by providing the correcting means for the projecting method, the binary image can be reduced while eliminating the drawback of the projecting method such as an extinction of the thin lines or the like. On the other hand, by expressing the correction variable threshold value or a variable matrix, the correction amount and the concentration can be independently adjusted. On the other hand, in the case of repeating the reduction, the noises which are generated can be eliminated at a necessary stage.

Although several preferred embodiments have been described above, the present invention is not limited to the foregoing embodiment but many modifications and variations are possible within the spirit and scope of the appended claims of the invention.

We claim:

1. An image processing apparatus comprising:
   first input means for inputting image data of an object pixel;
   second input means for inputting image data of a neighboring pixel of the object pixel;
   third input means for inputting reduced image data of a pixel other than the object pixel; and
   processing means for processing the image data simultaneously input by said first, second and third input means, and outputting processed data.

2. An apparatus according to claim 1, wherein said processing means comprises look-up-table means.

3. An apparatus according tot claim 2, wherein first, second and third input means comprise address lines for addressing said look-up-table means.

4. An apparatus according to claim 3, further comprising holding means for holding image data of the object pixel, image data of a neighboring pixel of the object pixel and reduced image data of the pixel other than the object pixel.

5. An apparatus according to claim 1, wherein said processing means performs an image reduction process.

6. An apparatus according to claim 1, wherein said processing means comprises a ROM.

7. An image processing apparatus comprising:
   first memory means for storing first image data representing an image which has a first resolution;
   second memory means for storing second image data representing an image which has a second resolution lower than the first resolution;
   common reduction means for reducing a size of an image represented by input image data, to produce a reduced image; and
   selection means for selecting one of the first image data stored in said first memory means and the second image data stored in said second memory means and for supplying selected image data to sad common reduction means for performing a reduction process.

8. An apparatus according to claim 7, further comprising supply means for supplying a parameter for reduction to said common reduction means.

9. An apparatus according to claim 7, wherein said common reduction means performs half-reduction, in producing the first and the second reduced image.

10. An apparatus according to claim 7, wherein said common reduction means comprises means for preserving fine lines of an image.

11. An apparatus according to claim 7, wherein said common reduction means comprises a look-up-table.

* * * * *

UNITED STATES PATENT AND TRADEMARK OFFICE
CERTIFICATE OF CORRECTION

PATENT NO. : 5,309,524
DATED : May 3, 1994
INVENTOR(S) : Yasuji Hirabayashi, et al It is certified that error appears in the above-indentified patent and that said Letters Patent is hereby corrected as shown below:

IN THE DRAWINGS

Sheet 4 of 11, "SUBTRACTOR" should read --SUBTRACTER--.

COLUMN 3

Line 21, "reduced" should read --be reduced--.

COLUMN 5

Line 1, "subtractor 24" should read --subtracter 24--.
Line 16, "value e.g." should read --value, e.g.,--.
Line 65, "-3line" should read --3-line--.

COLUMN 6

Line 34, "value $X_0$." should read --value $X_0$,--.

COLUMN 8

Line 52, "OR circuit 74." should read --OR circuit 75.--.

COLUMN 9

Line 5, "block" should read --block,--.
Line 25, "referred" should read --referred to--.
Line 49, "correcition" should read --correction--.
Line 54, boldface should be deleted.

COLUMN 11

Line 50, "a1.1 to a3.3" should read --$a_{1.1}$ to $a_{3.3}$--.

UNITED STATES PATENT AND TRADEMARK OFFICE
CERTIFICATE OF CORRECTION

PATENT NO. : 5,309,524
DATED : May 3, 1994
INVENTOR(S) : Yasuji Hirabayashi, et al It is certified that error appears in the above-indentified patent and that said Letters Patent is hereby corrected as shown below:

COLUMN 12

Line 26, "noises." should read --noise.--.

COLUMN 13

Line 14, "FIG. 20B In" should read --FIG. 20B. In--.
Line 22, "number of" should be deleted.
Line 34, "tion variable" should read --tion value by a function of the threshold value by using a variable--.
Line 37, "the noises which are" should read --noise which is--.
Line 41, "embodiment" should read --embodiments--.

COLUMN 14

Line 10, "tot" should read --to-- and "first," should read --said first,--.
Line 34, "sad" should read --said--.

Signed and Sealed this

Eighteenth Day of October, 1994

Attest:

BRUCE LEHMAN

Attesting Officer     Commissioner of Patents and Trademarks